US012693587B2

(12) United States Patent
Ruegheimer

(10) Patent No.: US 12,693,587 B2
(45) Date of Patent: Jul. 28, 2026

(54) LASER LIGHT SOURCE ARRANGEMENT, ILLUMINATION UNIT AND LASER PROJECTION DEVICE

(71) Applicant: ams-OSRAM International GmbH, Regensburg (DE)

(72) Inventor: Tilman Ruegheimer, Regensburg (DE)

(73) Assignee: ams-OSRAM International GmbH, Regensburg (DE)

( * ) Notice: Subject to any disclaimer, the term of this patent is extended or adjusted under 35 U.S.C. 154(b) by 345 days.

(21) Appl. No.: 18/275,738

(22) PCT Filed: Feb. 4, 2022

(86) PCT No.: PCT/EP2022/052734
§ 371 (c)(1),
(2) Date: Aug. 3, 2023

(87) PCT Pub. No.: WO2022/167592
PCT Pub. Date: Aug. 11, 2022

(65) Prior Publication Data
US 2024/0295803 A1 Sep. 5, 2024

(30) Foreign Application Priority Data
Feb. 5, 2021 (DE) ..................... 10 2021 102 798.5

(51) Int. Cl.
*G03B 21/20* (2006.01)
*G03B 21/16* (2006.01)

(52) U.S. Cl.
CPC ....... *G03B 21/204* (2013.01); *G03B 21/2013* (2013.01); *G03B 21/16* (2013.01)

(58) Field of Classification Search
CPC ... G03B 21/204; G03B 21/2013; G03B 21/16
(Continued)

(56) References Cited

U.S. PATENT DOCUMENTS

| | | | |
|---|---|---|---|
| 2007/0070303 A1 | 3/2007 | Yonekubo | |
| 2009/0219488 A1 | 9/2009 | Dufour | |
| 2012/0051044 A1 | 3/2012 | Akiyama | |
| 2015/0253653 A1* | 9/2015 | Fujita | G03B 21/204 |
| | | | 353/31 |

(Continued)

FOREIGN PATENT DOCUMENTS

| | | |
|---|---|---|
| CN | 104111532 A | 10/2014 |
| CN | 204178113 U | 2/2015 |

(Continued)

OTHER PUBLICATIONS

Translation of CN_107632487_A_ (Year: 2025).*
(Continued)

*Primary Examiner* — Jerry L Brooks
(74) *Attorney, Agent, or Firm* — Hauptman Ham, LLP

(57) ABSTRACT

A laser light source arrangement for a laser projection device includes a laser diode array. The laser diode array includes a first light group with at least one first laser diode and a second light group with at least one second laser diode. The first laser diode and the second laser diode include spectrally different emission maxima. The first laser diode includes an emission maximum in a wavelength range of 440-462 nm. The second laser diode includes an emission maximum in a wavelength range of 462-472 nm. The laser diode array is accommodated in a housing in such a way that the beam paths of the first laser diode and the second laser diode extend spatially separated within the housing.

12 Claims, 4 Drawing Sheets

(58) Field of Classification Search
USPC .......................................................... 353/30
See application file for complete search history.

(56) References Cited

U.S. PATENT DOCUMENTS

| | | | |
|---|---|---|---|
| 2016/0195236 A1 | 7/2016 | Kita | |
| 2018/0278013 A1 | 9/2018 | Kanskar et al. | |
| 2019/0041740 A1* | 2/2019 | Yasuda | G03B 21/204 |
| 2019/0086779 A1 | 3/2019 | Chang | |
| 2019/0310539 A1 | 10/2019 | Yamagishi et al. | |
| 2020/0301156 A1* | 9/2020 | Nagahara | G02B 27/283 |
| 2020/0301265 A1 | 9/2020 | Yan et al. | |
| 2020/0366066 A1 | 11/2020 | Landles | |
| 2021/0041776 A1* | 2/2021 | Tsai | G03B 21/204 |

FOREIGN PATENT DOCUMENTS

| | | | | |
|---|---|---|---|---|
| CN | 106909019 A | | 6/2017 | |
| CN | 107632487 A | * | 1/2018 | G03B 21/204 |
| DE | 10 2010 003 234 A1 | | 9/2011 | |
| DE | 11 2013 004 405 B4 | | 10/2020 | |
| JP | 2016-18594 A | | 2/2016 | |
| JP | 2016-218383 A | | 12/2016 | |
| JP | 2017-116906 A | | 6/2017 | |
| JP | 2020-154209 A | | 9/2020 | |

OTHER PUBLICATIONS

International Search Report issued for corresponding International Patent Application No. PCT/EP2022/052734 on Jun. 3, 2022, along with an English translation (7 pages).
Written Opinion issued for corresponding International Patent Application No. PCT/EP2022/052734 on Jun. 3, 2022 (6 pages).
Huang et al., "Laser diode end-pumped coupling system applying multi-aperture beam integration principle", Infrared and Lwser Enginerring, vol. 39, No. 3, Jun. 2010, pp. 437-468 (6 pages), with an English Abstract.

* cited by examiner

1

LASER LIGHT SOURCE ARRANGEMENT, ILLUMINATION UNIT AND LASER PROJECTION DEVICE

CROSS REFERENCE TO RELATED APPLICATION

This application is a National Stage of International Application No. PCT/EP2022/052734, filed on Feb. 4, 2022, which designates the United States and was published in Europe, and which claims priority to German Patent Application No. 10 2021 102 798.5, filed on Feb. 5, 2021, in the German Patent Office. All of the aforementioned applications are hereby incorporated by reference in their entireties.

The present invention relates to a laser light source arrangement, an illumination unit comprising the same, and a laser projection device using the illumination unit.

The use of semiconductor light sources to illuminate an imaging system in a projection device, such as a micromirror device (DMD) or a liquid crystal panel, is well known. Compared to large-scale illumination modules with discharge lamps, semiconductor light sources allow more compact assemblies for illumination. In addition to LEDs (LED=Light Emitting Diode), laser diode arrays are used as semiconductor light sources, which are characterized by improved lifetime, good energy efficiency and high spectral stability, so that luminous laser projection devices with improved color saturation can be realized.

For extensive coverage of the visible spectrum, in particular for professional laser projection devices of light play theaters, high-quality home theaters and miniaturized projectors for smartphones, separate blue, green or red emitting light source units are provided, which are typically spatially arranged separately and whose emission is combined by means of beam combining optics. In this regard, reference is made to US 2020/0301265 A1 by way of example.

US 2020/0301156 A1 describes a compact light source assembly with at least two illumination modules, each of which combines laser diode arrays for blue, green and red. The individual illumination modules are at right angles to each other, so that beam superimposition and spectral mixing are achieved by means of an optical multiplexer arranged in an angular position and illuminated from the front and rear, which has locally different dichroic mirror surfaces.

According to the current state of development, laser diodes emitting in the blue, green and red parts of the visible spectrum differ in terms of the achievable light yield, with laser diodes based on InGaN semiconductors with an emission maximum in the green-yellow part of the visible spectrum tolerating lower current densities than those emitting blue. Furthermore, laser diodes for red light have higher thermal stabilization requirements compared to laser diodes for shorter wavelengths. For these reasons, light-generating devices for laser projectors with a monochromatic light source are usually more economical. These typically use high-power laser diodes emitting in the blue, which feed the blue channel and are also used to excite a wavelength conversion element that provides electromagnetic radiation in the green and red regions. For generic laser projection devices, blue laser diodes are used to excite spectrally different fluorescent materials, such as phosphor-based materials. For sequential generation of the spectral colors, a rotating component with a fluorescent coating can be used as the wavelength conversion element. Such a color wheel is disclosed, for example, by DE 10 2010 003 234 A1.

For excitation of the wavelength conversion element, laser diodes are typically used whose emission maximum lies in a wavelength range of 440-462 nm. Known laser diode arrays for this purpose provide emission of 455 nm with a narrow spectral distribution of +/−6 nm around this maximum. This wavelength band has been found to be particularly suitable for fluorescence generation with phosphor materials or cerium doped yttrium aluminum garnet. If the blue excitation light is also used to display blue, matching it to the wavelength conversion element results in a limitation of the color gamut that can be projected onto a screen. For example, the Rec. 2020 standard requires the displayability of blue with 100% saturation at a wavelength of 467.1 nm. This "pure blue", which cannot be achieved with the aforementioned wavelength band adapted to fluorescence excitation, is defined by the color spaces sRGB, Rec. 709 and DCI-P3 at 467.7 nm.

DE 11 2013 004 405 B4 describes an illumination arrangement for a laser projection device with two stationary, spatially separated wavelength conversion elements assigned to different spectral ranges. This allows simultaneous emission of radiation in the green and red, which is superimposed in the further beam path. A laser diode array with two alternately arranged laser diode types, which differ with regard to the polarization direction and/or the spectral band of the emitted electromagnetic radiation, is used to excite the two wavelength conversion elements. A beam splitter optics arranged in the beam path between the laser diode array and the wavelength conversion elements takes advantage of this difference in emission characteristics so that radiation from the first laser diode type is directed exclusively to the first wavelength conversion element and from the second laser diode type is directed exclusively to the second wavelength conversion element. For the blue portion of the illumination, DE 11 2013 004 405 B4 proposes for a preferred embodiment to use a third separate light source coupled in the beam path after the wavelength conversion elements by means of a collimating lens system. The optics required to guide the beam results in a complex and large-scale illumination arrangement.

It is an object of the invention to provide a compact, easy-to-use laser light source arrangement for the illumination unit of a laser projection device. Furthermore, an illumination unit comprising a wavelength conversion element and the laser light source arrangement is to be mentioned which is characterized by a high color space coverage and occupies a small installation space. For a preferred embodiment, a gamut as large as possible according to the Rec. 2020 standard, in particular with a color space coverage of the long-wave (blue) range as complete as possible, is to be given. Furthermore, the task relates to specifying a laser projection device with a space-saving illumination unit that has a high image quality and a wide color gamut.

The object is solved by the features of claim 1. Advantageous embodiments of the laser light source arrangement are the subject of the subclaims, and claims 10 and 11 relate to an illumination unit comprising the same and to a laser projection device.

The laser light source arrangement according to the invention comprises a laser diode array having a first light group comprising at least one first laser diode and a second light group comprising at least one second laser diode. Thereby, the first laser diode and the second laser diode provide spectrally different emission maxima, with the first laser diode providing an emission maximum in a wavelength range of 440-462 nm and the second laser diode providing an emission maximum in a wavelength range of 462-472 nm. In addition, the laser diode array is accommodated in a housing such that the beam paths of the first laser diode and the second laser diode are spatially separated within the housing.

Thus, the laser light source arrangement according to the invention forms a module that can be handled as a construction unit, which with the first light group provides radiation with an emission maximum in the blue wavelength band of 440-462 nm for fluorescence excitation and with the second light group, whose wavelength also lies in the blue part of the spectrum (emission maximum in a wavelength range of 462-472 nm), forms a separate blue channel that meets the requirements for a 100% saturated pure blue according to one of the standards Rec. 2020, SRGB, Rec. 709 or DCI-P3. Consequently, the laser light source arrangement according to the invention enables an extended color range by means of a component in the form of a module with compact dimensions.

For advantageous embodiments, the first light group provides an emission maximum in a wavelength range of 450-460 nm. Furthermore, it is preferred to use an emission maximum in a wavelength range of 464-470 nm and particularly preferred in a wavelength range of 466-468 nm for the second light group.

The illumination in the green and red range of the visible spectrum can be brought about by the excitation of a wavelength conversion element with the first light group. This will be described in more detail in the further description in connection with a further embodiment of the invention relating to the illumination unit of a laser projection device, which comprises the laser light source arrangement.

For an advantageous embodiment of the laser light source arrangement according to the invention, further color channels which can be directly supplied to the illumination can be used. Preference is given to the inclusion of a third light group in the laser diode array enclosed by the common housing. In this case, the third light group has at least one third laser diode that emits an emission maximum in the red wavelength range of 610-635 nm and preferably in a wavelength range of 627-633 nm.

In addition to the reduced installation space requirement, the laser light source arrangement according to the invention is characterized by simplified manageability as a module. For this purpose, the laser diodes of the laser diode array are arranged within the housing in such a way that beam paths of laser diodes from different light groups extend spatially separated at least until they exit the housing. Thus, the separate color channel (s) can be separated from the emission of the first light group intended for fluorescence excitation by simple optics, in particular reflective components such as staircase mirrors and microlenses. Consequently, the use of dichroic optics can be dispensed with. Preferably, the laser diodes are therefore spatially arranged according to their emission characteristics, i.e. according to their affiliation to one of the light groups. Advantageously, the laser diodes are arranged on a carrier forming part of the housing in such a way that the transverse spacing between laser diodes from different light groups is at least 2 mm and preferably at least 4 mm. Here, the transverse spacing is defined as the distance between the centers of gravity of the active zones of two laser diodes. Within the respective light group, the laser diodes may be more tightly packed, preferably resulting in an arrangement that leads to a concentration of the laser diodes belonging to one of the light groups. These resulting laser diode areas then have the required transverse spacing from neighboring areas, insofar as their laser diodes are assigned to a different light group.

In order not to increase the size of the laser light source arrangement too far, the preferred upper limit for the transverse spacing is 10 mm and particularly preferably 8 mm.

For a further, advantageous embodiment of the laser light source arrangement according to the invention, a beam guiding device for collimating and/or separating the beam paths of laser diodes from different light groups is associated with the laser diode array. Preferably, at least a part of the components of the beam guiding device is arranged within the housing and/or combined with the housing to form an assembly. The beam guiding device serves to separate the emission of the different light groups, so that the separate color channel and the excitation light can emerge from the housing of the laser light source arrangement with a spatially objected beam expansion and preferably be radiated in different spatial directions.

Advantageously, each of the light groups comprises a plurality of monochromatic laser diodes whose divergent radiation is allowed to overlap within the housing, provided that it is ensured that there is no overlap with the beam path of a laser diode not belonging to the respective light group. Preferably, microlens arrays and reflective optics associated with the individual laser diodes are used for beam guidance.

For a further advantageous embodiment of the laser light source arrangement, a heat path common to all laser diodes of the laser diode array is present for cooling. This can be designed integrally with the carrier of the laser diodes. This design is particularly advantageous if a third light group with long-wave emitting laser diodes is included in the laser light source arrangement designed as a module, since there are then higher requirements for temperature constancy. In addition, the common heat path allows the laser diodes to be assembled on a carrier to form a laser diode array by means of a uniform process.

Furthermore, the laser light source arrangement is preferably designed for external control. For this purpose, an electrode arrangement for contacting the laser diodes is provided, which is guided out of the housing. The electrode arrangement is designed in such a way that laser diodes from different light groups can be controlled independently of one another. For possible designs, further subgroups are formed within a light group, for example line- or column-shaped arrangements of laser diodes that can be controlled together. The external electrical control allows the current intensity and the output power to be set separately for the laser diodes of different light groups.

For a continuation of the invention, an illumination unit comprises the laser light source arrangement described above. In addition, a wavelength conversion element and superposition optics are provided. According to the invention, the illumination unit is arranged such that the wavelength conversion element is excited by the light emission of the first light group of the laser light source arrangement to emit a fluorescence radiation and the superposition optics combines the light emission of the second light group of the laser light source arrangement and the fluorescence radiation into an illumination beam path. Due to the design of the laser light source arrangement as a module and the spatial separation of the radiation for the fluorescence excitation and that for the separate color channel, the optics associated with the illumination unit for the beam guidance can be simplified and designed to be small. Furthermore, the laser light source arrangement, which is present as an assembly, can be easily replaced.

According to a further development of the invention, a laser projection device with an imaging system and an illumination unit according to the invention is proposed. In addition to a compact size, the latter is characterized by an illumination of the imaging system which covers an extended color space on the projection surface. In addition to the high color saturation achieved, a further advantage is an increase in the achievable accuracy for the white point calibration that can be carried out by the customer. In addition, the modular laser light source arrangement leads to simplified compensation of thermal effects during operation of the laser projection device.

In the following, exemplary embodiments of the invention are explained in connection with figure representations. These show, in each case schematically, the following:

Figure 1:
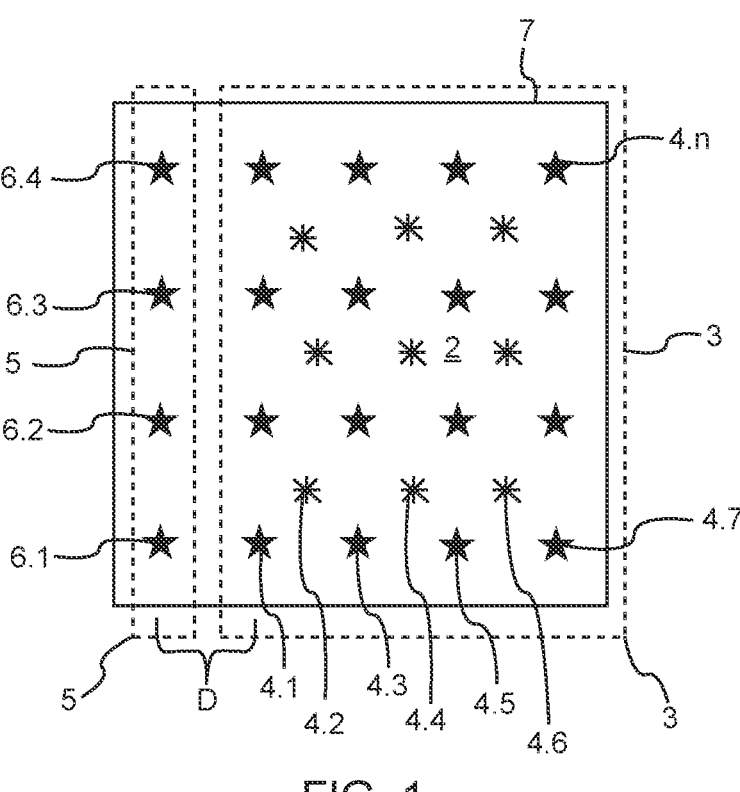
FIG. 1 shows a first embodiment of the laser light source arrangement according to the invention in plan view.

FIG. 1 shows in schematic simplification the laser light source arrangement 1 according to the invention, which comprises a laser diode array 2 surrounded by a housing 7 so as to form a module which can be handled as a structural unit.

The laser diode array 2 is divided into a first light group 3 and a second light group 5, which emit spectrally different laser light. Thereby, the first light group 3 has first laser diodes 4.1, . . . , 4.$n$, whose emission maximum lies in a wavelength range of 440-462 nm and preferably in an interval of 450-460 nm. This blue emission is matched to the fluorescence excitation and does not exactly meet the definition for pure blue according to one of the color space standards Rec. 2020, SRGB, Rec. 709 or DCI-P3. Therefore, a second light group 5 is provided for feeding a blue channel, wherein the second laser diodes 6.1, . . . , 6.4 assigned to the second light group 5 have an emission maximum in a wavelength range of 462-472 nm, preferably of 464-470 nm and particularly preferably of 466-468 nm, so that "pure blue" can be emitted with a color saturation of 100%. Thus, in particular, the entire blue range according to the color standard Rec. 2020 can be covered.

According to the invention, the first and second laser diodes 4.1, . . . , 4.$n$; 6.1, . . . , 6.4 are arranged in such a localized manner within the laser diode array 2 that the beam paths 8.1, 8.2 emanating from the laser diodes 4.1, . . . , 4.$n$; 6.1, . . . , 6.4 from different light groups 3; 5 extend spatially separated within the housing 7. Advantageously, the laser diodes 4.1, . . . , 4.$n$; 6.1, . . . , 6.4 are mounted on a carrier 9, which forms part of the housing 7, in such a way that laser diodes 4.1, . . . , 4.$n$; 6.1, . . . , 6.4, which do not belong to the same light group 3; 5, have a transverse spacing D which is adapted to the beam divergence of the first laser diodes 4.1, . . . , 4.$n$ and the second laser diodes 6.1, . . . , 6.4. For typical sizes, a transverse spacing D of at least 2 mm and preferably of at least 4 mm has proven to be advantageous in order to keep the light paths of the first light group 3 and the second light group 5 separated within the housing 7. As an upper limit for the transverse distance D, 10 mm and especially 8 mm are preferred.

Figure 2:
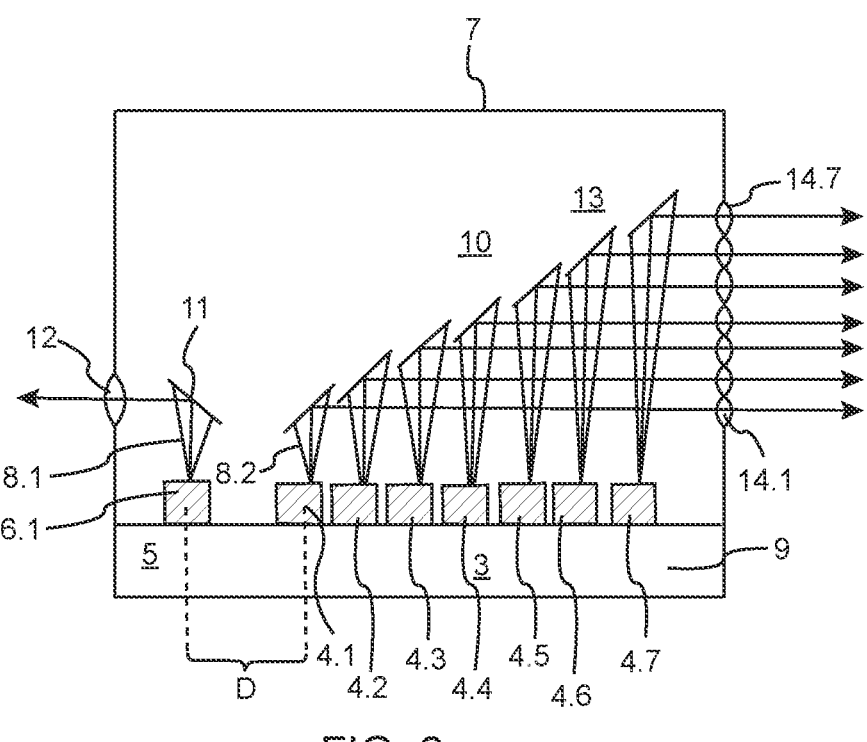
FIG. 2 shows the laser light source arrangement according to the invention from FIG. 1 in cross-section.

As a further preferred measure for spatial separation of the beam paths 8.1, 8.2 of the first laser diodes 4.1, . . . , 4.$n$ and the second laser diodes 6.1, . . . , 6.4, FIG. 2 shows a beam guiding device 10 within the housing 7. The beam guiding device 10 comprises a mirror 11 and a microlens 12 which deflect and collimate the beam path 8.1 emanating from the second laser diode 6.1. Accordingly, the step mirror 13 and the microlenses 14.1, . . . , 14.7 detect only radiation emanating from the first laser diodes 4.1, . . . , 4.7 and emit it bundled at the opposite side of the housing 7.

Figure 3:
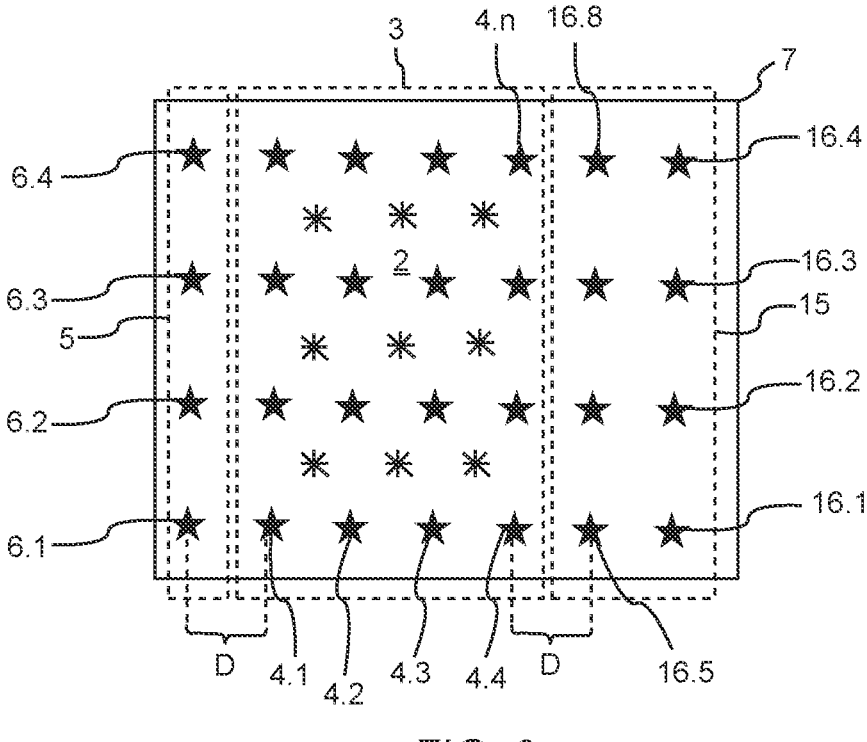
FIG. 3 shows a second embodiment of the laser light source arrangement according to the invention in plan view.

FIG. 3 shows a second embodiment of the laser light source arrangement 1 according to the invention, whereby the same reference signs are used for the components corresponding to the first embodiment. Shown is an additional third light group 15 within the housing 7. Here, the third light group 15 of the laser diode array 2 has at least one third laser diode 16.1, . . . , 16.8, which emits an emission maximum in the wavelength range of 610-635 nm and preferably in a wavelength range of 627-633 nm, which serves to illuminate a red channel. In this way, the color spectrum that can be illuminated can be additionally extended.

Figure 4:
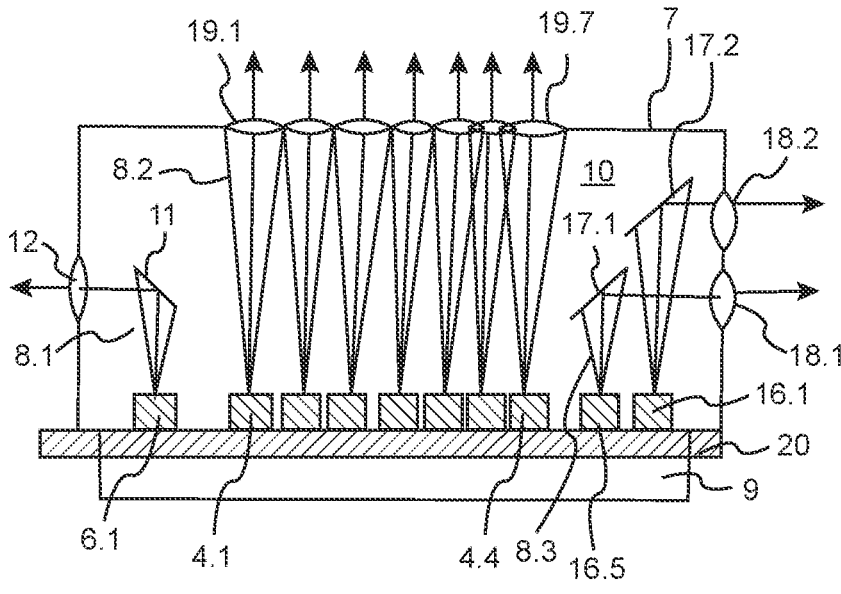
FIG. 4 shows the laser light source arrangement according to the invention from FIG. 3 in cross-section.

The side view of the second design shown in FIG. 4 illustrates that the arrangement of the first laser diodes 4.1, . . . , 4.$n$, the second laser diodes 6.1, . . . , 6.4 and the third laser diodes 16.1, . . . , 16.8 is selected in such a way that the beam paths 8.1, 8.2, 8.3 for laser diodes 4.1, . . . , 4.$n$; 6.1, . . . , 6.4; 16.1, . . . , 16.8 from different light groups 3; 5; 15 extend spatially separated in the housing 7. For this purpose, the aforementioned transverse spacing D is maintained. Furthermore, a beam guiding device 10 is provided within the housing 7, wherein the microlenses 18.1, . . . , 18.7 are assigned to the first laser diodes 4.1, . . . , 4.$n$; the mirror 11 and the microlens 12 are assigned to the second laser diode 6.1 and the mirrors 17.1, 17.2 and the microlenses 18.1, 18.2 are assigned to the third laser diodes 16.1, 16.5 in such a way that the different light groups 3; 5; 15 emit light on different sides of the housing 7 of the laser light source arrangement 1.

Furthermore, a common heat path 20 is provided for all laser diodes 4.1, . . . , 4.$n$; 6.1, . . . , 6.4; 16.1, . . . , 16.8 of the laser diode array 2. By using a single cooling element integrated into or forming the carrier 9, the assembly of the laser diodes 4.1, . . . , 4.$n$; 6.1, . . . , 6.4; 16.1, . . . , 16.8 can be simplified and performed in a single process step. In addition, thermal stability during operation is improved.

Figure 5:
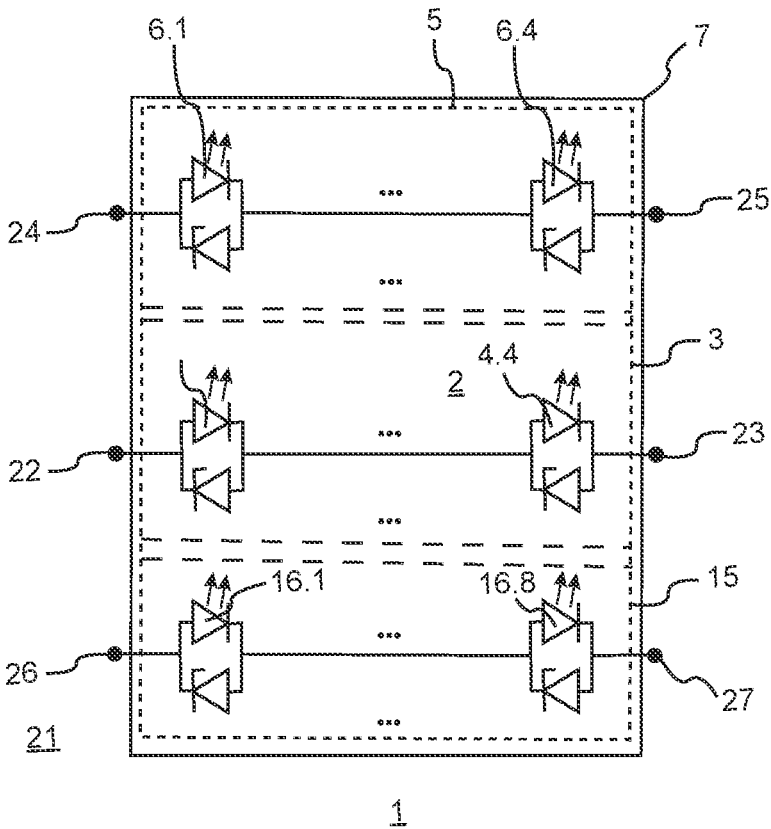
FIG. 5 shows the electrical contacting of the second embodiment of the laser light source arrangement according to the invention.

FIG. 5 shows the electrical contacting for a preferred embodiment of the second design. An electrode arrangement 21 leading out of the housing 7 is visible. This enables external and independent control of the different light groups 3; 5; 15 and thus group-wise adjustment of the current intensity and the output power for the laser diodes 4.1, . . . , 4.$n$; 6.1, . . . , 6.4; 16.1, . . . , 16.8. Sketched in detail are a first anode 22 and a first cathode 23 for the first light group 3; a second anode 24 and a second cathode 25 for the second light group 5 and a third anode 26 and a third cathode 27 for the third light group 15.

Figure 6:
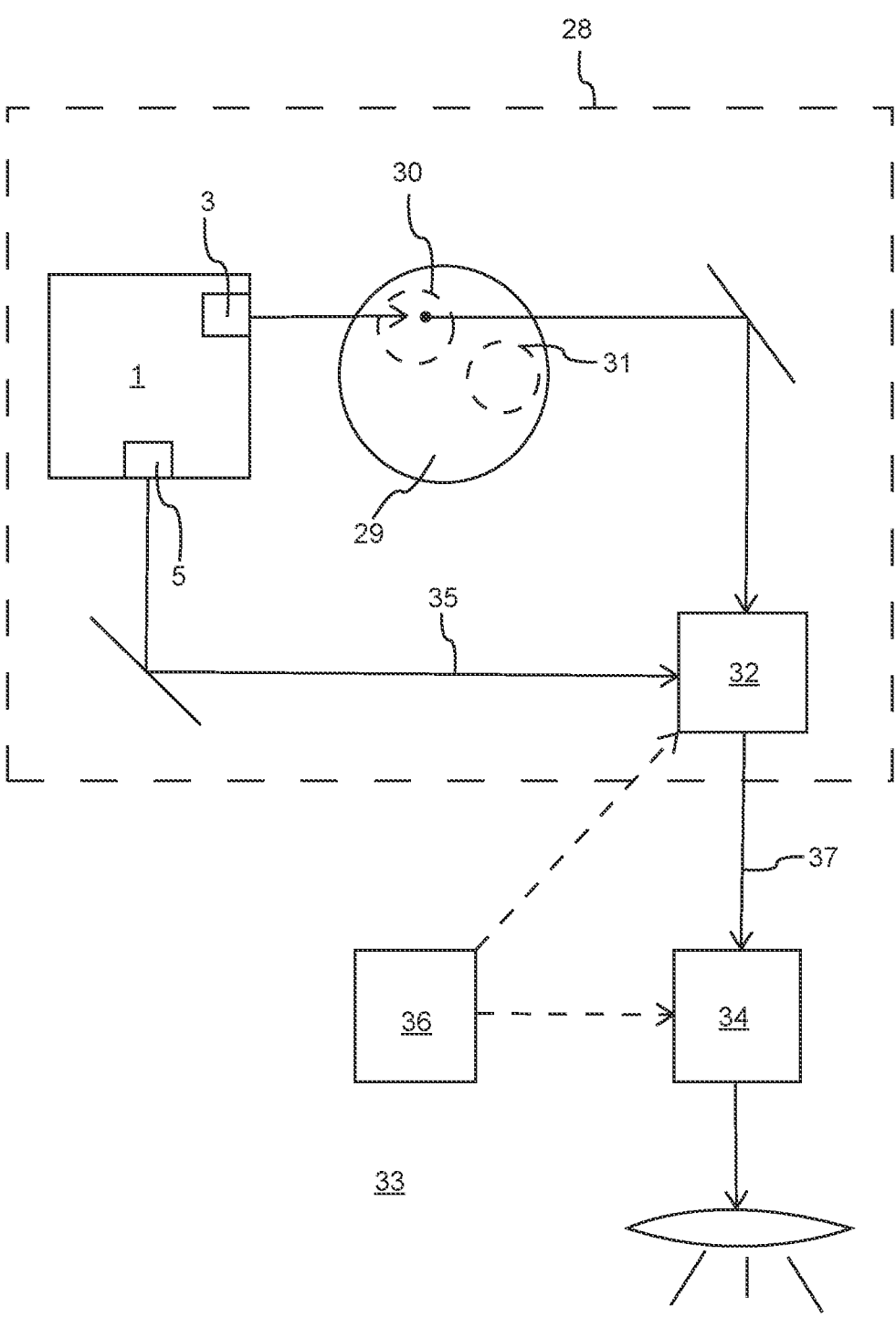
FIG. 6 shows a laser projection device with an illumination system comprising the first embodiment of the laser light source arrangement according to the invention.

FIG. 6 shows an illumination unit 28 according to the invention, which comprises the laser light source arrangement 1 described above forming an interchangeable a module, wavelength conversion element 29 and superposition optics 32. The wavelength conversion element 29 receives radiation from the first light group 3 of the laser light source arrangement 1, which serves to excite a first fluorescent material 30 and a second fluorescent material 31, which in turn emit radiation in the green and red parts of the visible spectrum. This fluorescent radiation connects the superposition optics 32 to the blue channel 35, which is fed directly by the second light group 5 of the laser light source arrangement 1. In the variant shown, the fluorescent materials 30, 31 are spatially separated from each other.

In a modified variant, no spatial separation of the fluorescent materials, such as the first fluorescent material 30 and the second fluorescent material 31, is provided on the conversion element 29 (not shown). In another modified embodiment, a single broadband emitting fluorescent material is used. This may be specifically provided for 3LCD systems in which not one, but three image generators (separated by primary color) are provided and irradiated with a continuously illuminating white light source. In this case, the beam paths of the primary colors may be separated by wavelength-selective optics, for example dichroic mirrors (not shown).

The illumination unit 28 is incorporated as a module in a laser projection device 33 and serves to illuminate an imaging system the laser projection device 33 is 34. In this context, characterized in particular by an extended color range and a compact, easy-to-install structure. Due to the laser light source arrangement 1 being present as a module, the separate blue channel does not form an additional component, so that an exchange of the light source and a white light calibration are possible in a simplified manner.

REFERENCE LIST 1 laser light source arrangement
2 laser diode array
3 first light group
4.1, 4.2, . . . , 4.*n* first laser diode
5 second light group
6.1, 6.2,
6.3, 6.4 second laser diode
7 housing
8.1, 8.2
8.3 beam path
9 carrier
10 beam guiding device
11 mirror
12 microlens
13 step mirror
14.1, 14.2 . . . , 14.7 microlens
15 third light group
16.1, 16.2, . . . , 16.8 third laser diode
17.1, 17.2 mirror
18.1, 18.2 microlens
19.1, . . . , 19.7 microlens
20 heat path
21 electrode arrangement
22 first anode
23 first cathode
24 second anode
25 second cathode
26 third anode
27 third cathode
28 illumination unit
29 wavelength conversion element
30 first fluorescent material
31 second fluorescence material
32 superposition optics
33 laser projection device
34 imaging system
35 blue channel 36 control system
37 illumination beam path
D transverse distance

The invention claimed is:

1. A laser light source arrangement for a laser projection device, comprising a laser diode array comprising a first light group with at least one first laser diode and a second light group with at least one second laser diode, the first laser diode and the second laser diode comprising spectrally different emission maxima; and a beam guiding device;

characterized in that the first laser diode comprises an emission maximum in a wavelength range of 440-462 nm and the second laser diode comprises an emission maximum in a wavelength range of 462-472 nm;

the laser diode array is accommodated in a housing in such a way that the beam paths of the first laser diode and the second laser diode extend spatially separated within the housing; and the beam guiding device is arranged such that light emitted by different light groups exits the housing from at least two different sides of the housing.

2. The laser light source arrangement according to claim 1, characterized in that the first laser diode comprises an emission maximum in a wavelength range of 450-460 nm.

3. The laser light source arrangement according to claim 1, characterized in that the second laser diode comprises an emission maximum in a wavelength range of 464-470 nm and in particularly in a wavelength range of 466-468 nm.

4. The laser light source arrangement according to claim 1, characterized in that the laser diode array comprises a third light group with at least one third laser diode, which comprises an emission maximum in a wavelength range of 610-635 nm and preferably in a wavelength range of 627-633 nm.

5. The laser light source arrangement according to claim 1, characterized in that the laser diodes are arranged on a carrier of the laser diode array in such a way that the transverse spacing between laser diodes from different light groups is at least 2 mm and preferably at least 4 mm.

6. The laser light source arrangement according to claim 5, characterized in that the transverse spacing between laser diodes within a respective light group is smaller than the transverse distance between laser diodes from different light groups.

7. The laser light source arrangement according to claim 1, characterized in that the laser diode array is assigned a beam guiding device for collimating and/or separating the beam paths of laser diodes from different light groups.

8. The laser light source arrangement according to claim 7, characterized in that at least some of the components of the beam guiding device are arranged within the housing and/or are combined with the housing to form an assembly.

9. The laser light source arrangement according to claim 1, characterized in that all laser diodes of the laser diode array are assigned a common heat path for cooling.

10. The laser light source arrangement according to claim 1, characterized in that an electrode arrangement for electrically driving the laser diodes is guided out of the housing, the electrode arrangement being designed in such a way that laser diodes from different light groups can be driven independently of one another.

11. An illumination unit comprising
a laser light source arrangement according to claim 1,
a wavelength conversion element; and
a superposition optics, wherein the illumination unit is configured such that the wavelength conversion element is excited to emit fluorescent radiation by light emission of the first light group of the laser light source arrangement, and the superposition optics combines the light emission of the second light group of the laser light source arrangement and the fluorescent radiation into an illumination beam path.

12. A laser projection device comprising an imaging system and an illumination unit according to claim 11 for illuminating the imaging system.

\* \* \* \* \*